United States Patent [19]

Roccucci

[11] Patent Number: 4,716,509
[45] Date of Patent: Dec. 29, 1987

[54] PWM INVERTER WITH TRAPEZOIDAL OUTPUT

[75] Inventor: Silvio Roccucci, Rome, Italy

[73] Assignee: Selenia Spazio, L'Aquila, Italy

[21] Appl. No.: 834,306

[22] Filed: Feb. 27, 1986

[30] Foreign Application Priority Data

Feb. 28, 1985 [IT] Italy ................ 47752 A/85

[51] Int. Cl.[4] ...................... H02M 3/337
[52] U.S. Cl. .................... 363/26; 363/97
[58] Field of Search .......... 363/24, 26, 82, 97, 363/134

[56] References Cited

U.S. PATENT DOCUMENTS

| | | | |
|---|---|---|---|
| 3,303,406 | 2/1967 | Bedford | 363/138 |
| 3,921,005 | 11/1975 | Watrous | 363/25 |
| 3,938,024 | 2/1976 | Clarke | 363/24 |
| 4,176,392 | 11/1979 | Cronin et al. | 363/26 |
| 4,287,556 | 9/1981 | Borland | 363/95 |
| 4,443,840 | 4/1984 | Grissler et al. | 363/24 |
| 4,558,230 | 12/1985 | Western | 363/26 |
| 4,559,591 | 12/1985 | Grünsch | 363/97 |
| 4,570,212 | 2/1986 | Edward et al. | 363/138 |
| 4,599,686 | 7/1986 | Muller et al. | 363/132 |
| 4,608,499 | 8/1986 | Rathmann | 363/132 |

*Primary Examiner*—Peter S. Wong
*Assistant Examiner*—Jeffrey Sterrett
*Attorney, Agent, or Firm*—Karl F. Ross; Herbert Dubno

[57] ABSTRACT

A pulse-width-modulated inverter-converter for generating a direct current output from a direct current supply which utilizes a power inverter having smoothed trapezoidal waveform at the inverter output. A nonlinear inductive element, e.g. a reactor, is provided in series with the center tap of the primary winding of the power transformer which is connected to the power transistors of the inverter to allow storage in a capacitor upstream of this inductor of energy during the recovery times of the transistors.

3 Claims, 13 Drawing Figures

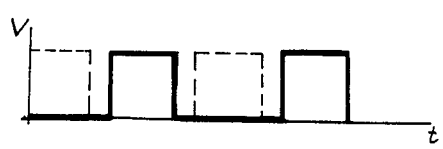
FIG.2A
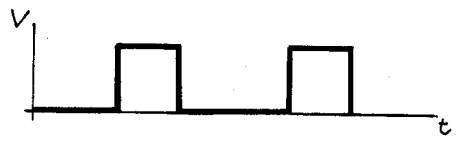
FIG.2B
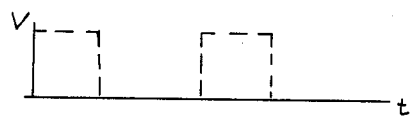
FIG.2C
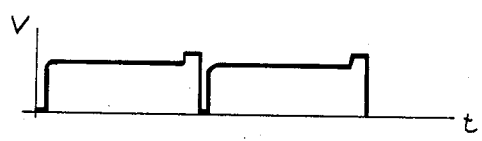
FIG.2D
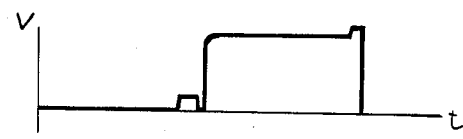
FIG.2E
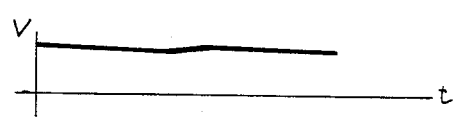

PWM INVERTER WITH TRAPEZOIDAL OUTPUT

FIELD OF THE INVENTION

My present invention relates to an alternating current pulse-width-modulated inverter-converter, i.e. an electrical power system for converting direct current to direct current via alternating current and having a smooth trapezoidal wave form of the output alternating current, which is capable of transferring energy with low losses in the rectifying diodes between the AC output and the load so that minimal losses are transmitted from the primary source to the DC output.

Note particularly, the invention relates to an alternating current pulse-width-modulated inverter-converter capable of high frequency operation for the AC output so that the rectifying diode likewise can operate at high frequency for low loss energy transfer from the primary source to the DC output line.

The invention is particularly adapted for space and ground or terrestrial uses. It is characterized by having within its converting circuit a magnetic generator through which energy with square wave current and controlled amplitude and duration is transferred from the primary source to the inverter. This magnetic generator can utilize a parasitic capacitor of the inverter transformer or connected across the inverter transformer or any other capacitive circuit suitably connected to the transformer to achieve a smooth trapezoidal AC voltage at the inverter output.

BACKGROUND OF THE INVENTION

It is known to provide pulse-width-modulated inverter-converter power circuits for receiving a direct current from a primary source, otherwise referred to as a source of direct-current supply voltage, and including a power inverter which transforms this direct current supply voltage to an alternating current which can be pulse-width modulated and has an AC output which is applied to a converter capable of transforming, by rectification, the alternating current into direct current for energization of a load. It is particularly desirable to provide high voltage generators of this type which are pulse-width-modulated and which is capable of feeding energy from the primary source to direct current output lines or to direct current load and which can operate with low losses within the inverter circuit, meaning that high frequencies of 10 to 30 kHz can be employed as the input to the rectifying diodes.

Prior systems of this type were unsatisfactory with respect to losses within the rectifying diodes.

The main drawbacks of earlier inverter-converter circuits were:

The switching transistors did not always operate within their safety ranges during switching times.

The overload and shortcircuit protection circuits were highly complex and not always reliable.

The rectified primary current waveform fed to a capacitive load often was highly distorted and at times was characterized by transient peaks which may be detrimental to the circuitry supply.

The high voltage rectifying diodes had high losses during switching so that the circuit had generally low efficiency.

Finally the thermal requirements were difficult to resolve for the high voltage use and the power diodes employed.

OBJECTS OF THE INVENTION

It is the principal object of the present invention to provide a power circuit of the type described, i.e. a pulse-width-modulated inverter-converter for direct current to direct current supply of a load from a source of a direct-current supply voltage whereby the aforedescribed disadvantages or drawbacks are obviated.

Another object of this invention is to provide a high efficiency pulse-width modulated inverter-converter which allows a reduction in the output filter size because the voltage and current fluctuations at the output are minimized, which allows simple control of the peak current drawn upon switching on of the equipment, which allows the power stage switching transition to operate well within their safety limit under all load conditions including accidental short circuit, which is not highly sensitive to capacitive filters present at DC output of the rectification stage and, in general, which represents a major advance in space and terrestrial inverter-converter power supply.

SUMMARY OF THE INVENTION

These objects and others which will become apparent hereinafter are attained, in accordance with the present invention by providing a pulse-width-modulated inverter-converter for generating an output from a direct-current supply voltage which includes a nonlinear inductive element, also referred to herein as a current magnetic generator, which sends constant current to the power transformer of the inverter and hence to the load, the magnetic current generator or nonlinear inductive element being preferably a reactor. This enables the generation in the inverter stage of an output AC voltage waveform which is smoothed trapezoidal and characterized by reduced electromagnetic (EFI) disturbances and sharply reduced rectifying diode losses during recovery time and both at low and high voltages. This reduction, which is largely independent of the inverter frequency range, simplifies the resolution of the thermal and technological problems which otherwise would be faced by the high voltage power generator of the invention particularly for space applications and also for many terrestrial applications.

The circuit of the invention can be used in a variety of applications.

For example in space applications it can be used for electronic power conditioners (epc) used to feed and control travelling wavetubes or klystrons, for alternating current energy distribution within a satellite at powers which may range from a few hundred watts to many kilowats and, in general, for DC to DC power supply applications.

Terrestrial applications of the circuit of the invention include high voltage generators with powers ranging from a few hundred watts to 10 kilowatts and more, especially for radar applications, and high voltage generators for travelling wave tubes (twt), especially for telecommunications purposes.

More particularly, the invention comprises:

a source of the direct-current supply voltage;

a power inverter connected to the source and provided with a power transformer having a periodic power output applicable to a load;

a main oscillator connected to the source and generating from the direct-current supply voltage a substantially square wave signal adapted to determine the frequency of the power output;

means connecting the main oscillator to the power inverter for generating the power output therein; and means including a nonlinear inductive element responsive to current drawn therethrough and interposed between the source and the power inverter for sending constant current energy to the power transformer and the load.

The nonlinear inductive element can include:

a reactor having one winding connected in circuit with the power inverter and traversed by a supply current thereto;

a nonlinear semiconductor device in series with another winding of the reactor; and a filter and recovery capacitor connected upstream of the reactor, the nonlinear semiconductor device acting as an energy recovery element toward the filter and recovery capacitor.

One winding of the reactor is connected in series between an input filter connected to the source and a centertap of a primary winding of the transformer, and the other winding of the reactor is of opposite polarity from the one winding and is connected in series with an output of the filter and the nonlinear semiconductor device to ground.

The nonlinear semiconductor device preferably is a diode having an anode connected to ground and a cathode connected to the other winding. The power inverter, moreover, can comprise:

a pair of transistors each having a respective emitter-collector network connected between a respective end of the primary winding and ground, the power transformer having a secondary winding, a signal applied to the primary winding being controlled so that a smoothed trapezoidal waveform is outputted by the transformer; and a full-wave rectifier connected across the secondary winding and receiving the smoothed trapezoidal waveform therefrom for applying the output to the load.

A parasitic capacitor can be connected across the primary winding or can represent the internal parasitic capacitor of the transformer. The secondary winding of the transformer can have a parallel-resonant circuit consisting of an inductor and a capacitor connected in series with a damping resistor connected thereacross.

BRIEF DESCRIPTION OF THE DRAWING

The above and other objects, features and advantages of the present invention will become more readily apparent from the following description, reference being made to the accompanying drawing in which:

FIGS. 2A-2I are waveform diagrams in which the amplitude is plotted against time, illustrating the waveform at various points in the circuit of FIG. 1 and corresponding points in the circuit described subsequently;

SPECIFIC DESCRIPTION

Figure 1:
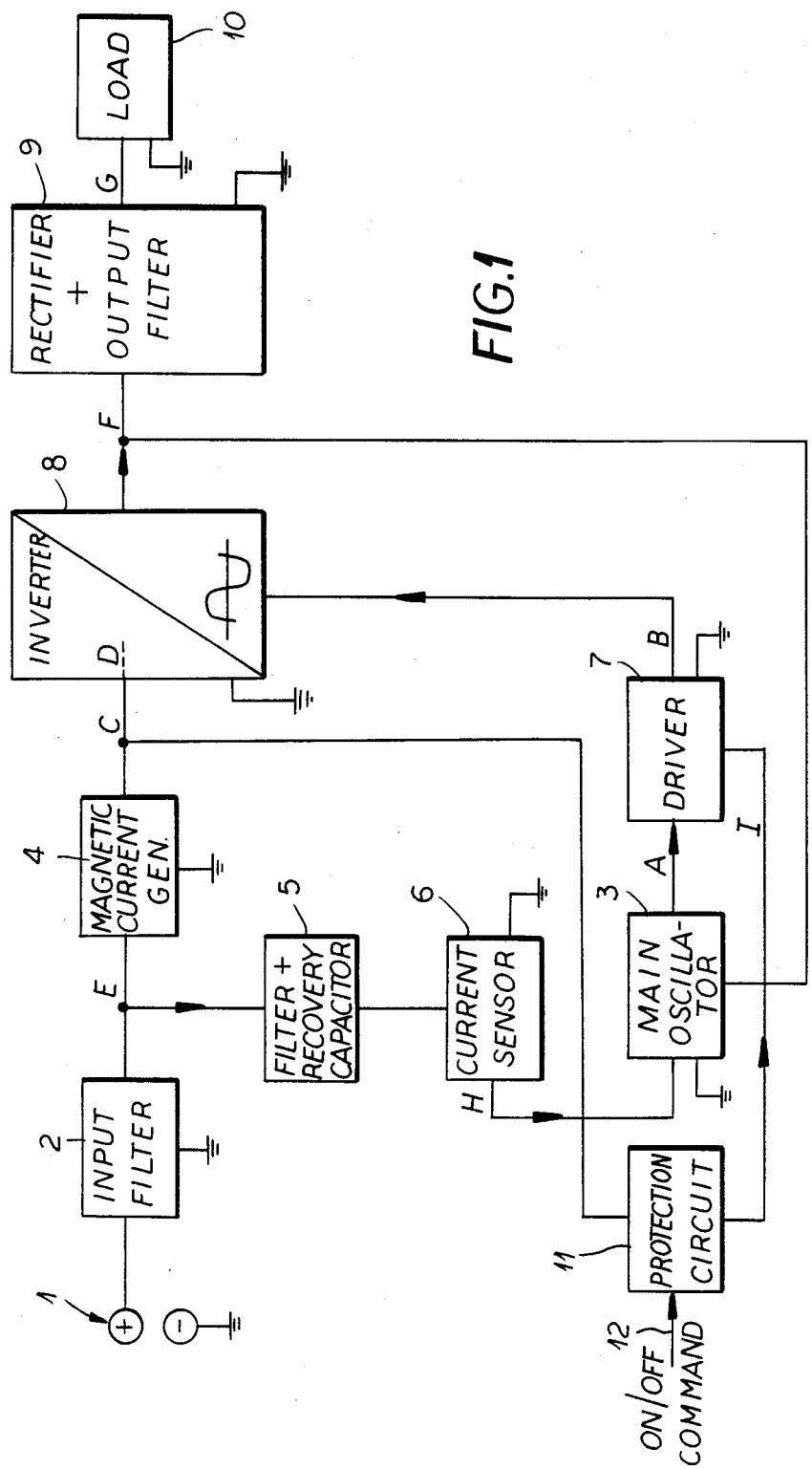
FIG. 1 is a block diagram of a pulse-width modulated inverter-converter circuit according to the present invention.

In FIG. 1 I have shown the two terminal 1 which represent the primary direct current voltage or power source and which is connected to an input filter 2 of conventional design. The input filter 2 is intended to filter out transients and to reject alternating current through the power source 1.

The output of the input filter is applied to a magnetic current generator or nonlinear inductive device represented generally at 4, the current from which is applied as a power signal to the inverter 8.

The inverter 8 is driven by the driver circuit 7 which, in turn, is controlled by the main oscillator 3 receiving an input from a current center 6 by bringing of a filter and recovery capacitor 5 connected to the current supply 3 of the filter 2 and on/off command signal can be applied at 12 to the protection and command circuitry 11 working into the driver 7. The output from the inverter is applied to a rectifier and output filter unit 9 feeding the load 10.

The various circuits represented in block form have been shown in greater detail in the FIGURES to be subsequently described.

Figure 2F:
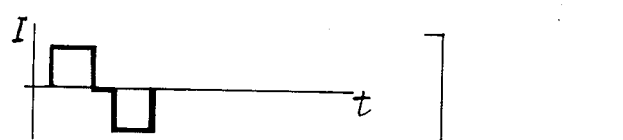
Figure 2G:
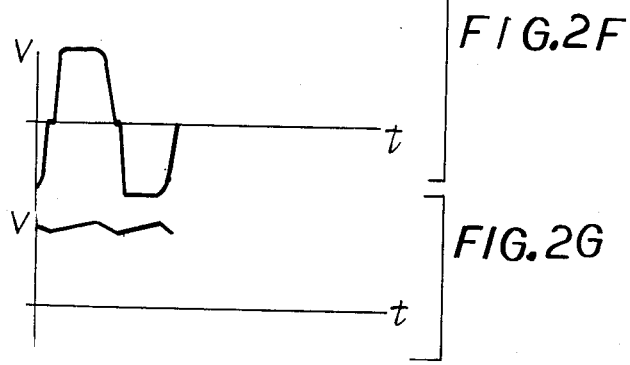
Figure 2H:
Figure 2I:
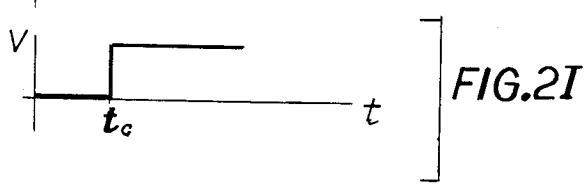

FIGS. 2A-2I show the waveforms respectively at the points represented at A through I in FIG. 1, thus FIG. 2A shows the main oscillator output voltage waveform, FIG. 2B shows the inverter signal waveform, FIG. 2C the inverter input voltage and current waveform from the magnetic current generator 4, FIG. 2D shows the inverter input current waveform and collector-2-emitter converter transistor voltage waveform, FIG. 2E shows the voltage and current waveform upstream of the magnetic current generator 4, FIG. 2F shows the alternating current and voltage waveform at the inverter output, FIG. 2G shows the direct current output voltage waveform downstream of the rectifier and output filter and as applied to the load 10, FIG. 2H shows the current center output voltage waveform and FIG. 2I shows the protection and command circuitry of the voltage waveform as applied to the driver circuit 7.

Figure 3:
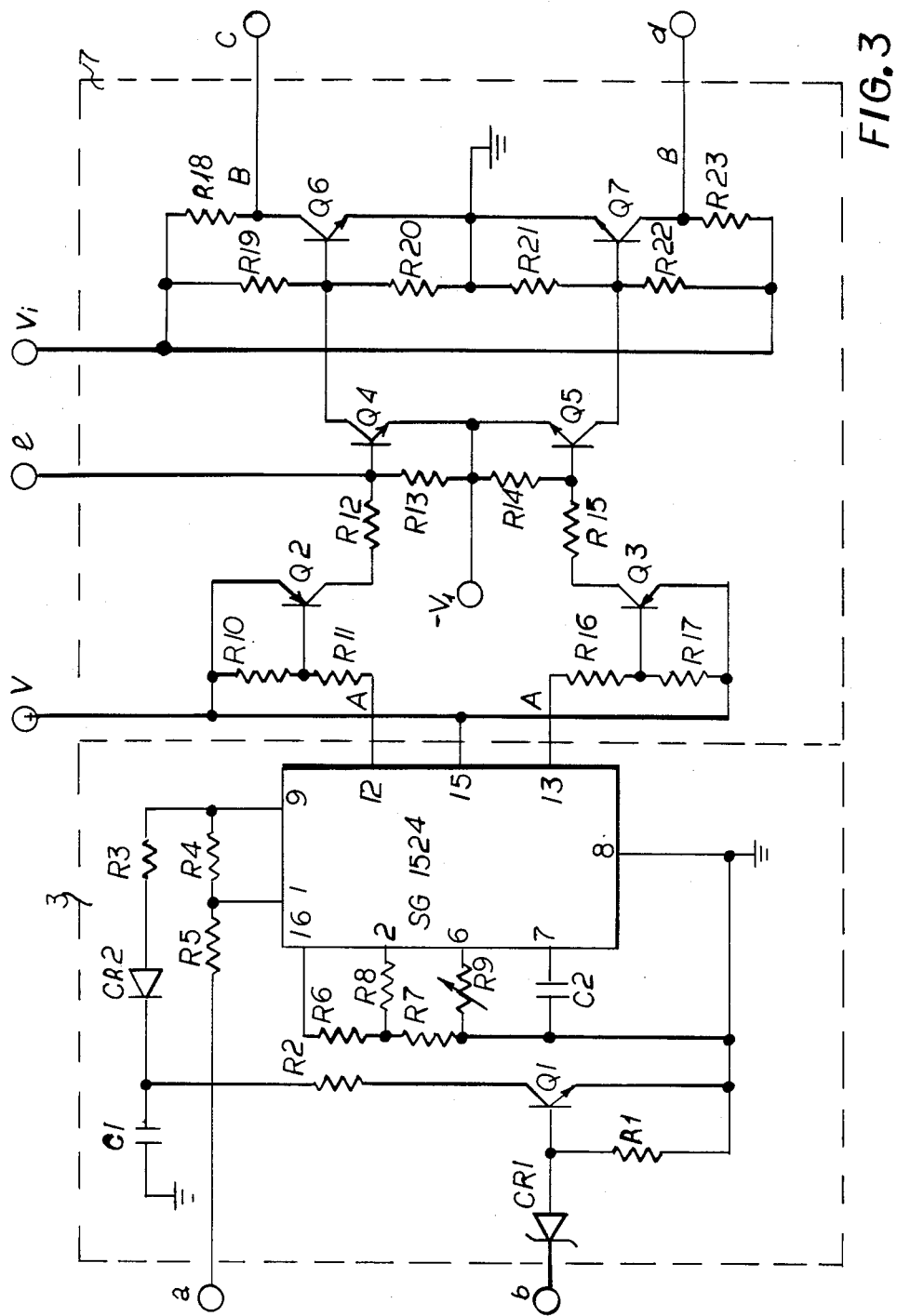
FIG. 3 is a circuit diagram of the principal oscillator and control circuit and the driver circuit connected thereto.

Referring now to FIG. 3, it will be apparent that terminals a and b at the input or left-hand side of the circuit 3, constituting the main oscillator, feed via the voltage divider R4 and R5, terminals 1 and 9 of the integrated circuit oscillator SG1524, whose terminal 8 is grounded and whose terminal 9 is connected through a resistor R3 and a diode CR2 and a capacitor C1 to ground. A resistor R2 connects the junction of the capacitor C1 and the diode CR2 to the collector of a transistor T1 whose emitter is tied to the terminal 7 through a capacitor C2 and to the terminals 6, 2 and 16 of the integrated circuit via resistors R6, R7, R8 and R9.

The base signal is delivered from the terminal b via the zener diode CR1 and the base emitter bias is provided by the resistor R1.

The driver circuit receives two outputs which are alternately effective from terminals 12 and 13 of the integrated circuit SG1524, whose terminal 15 is connected to the positive potential of the source represented at +V.

The signals A (FIG. 2A) are applied via resistors R11 and R16 to the bases of two driver transistors Q2 and Q3 whose base emitter bias resistors are represented at R10 and R17, respectively.

A signal is applied from the collectors of each of these transistors to resistors R12 and R15 to the bases of the transistors Q4 and Q5, the bases being interconnected by resistors 13 and R14, the latter forming base emitter bias resistors for these transistors as well and the junction of the resistors R13 and R14 being connected to the negative voltage source minus $V_1$.

The collectors of the transistors 24 and 25 are tied to the transistors 26 and 27, respectively, whose emitters are connected collectively to ground and which have base emitter signals are tapped across the mode resistors R18 and R23 in series with the collectors of these transistors and the positive voltage source $V_f$. The signals B thus are outputted at the terminal c and d of the driver 7. The collector base bias is provided by resistors R19 and R22 in the circuit of FIG. 3.

Figure 4:
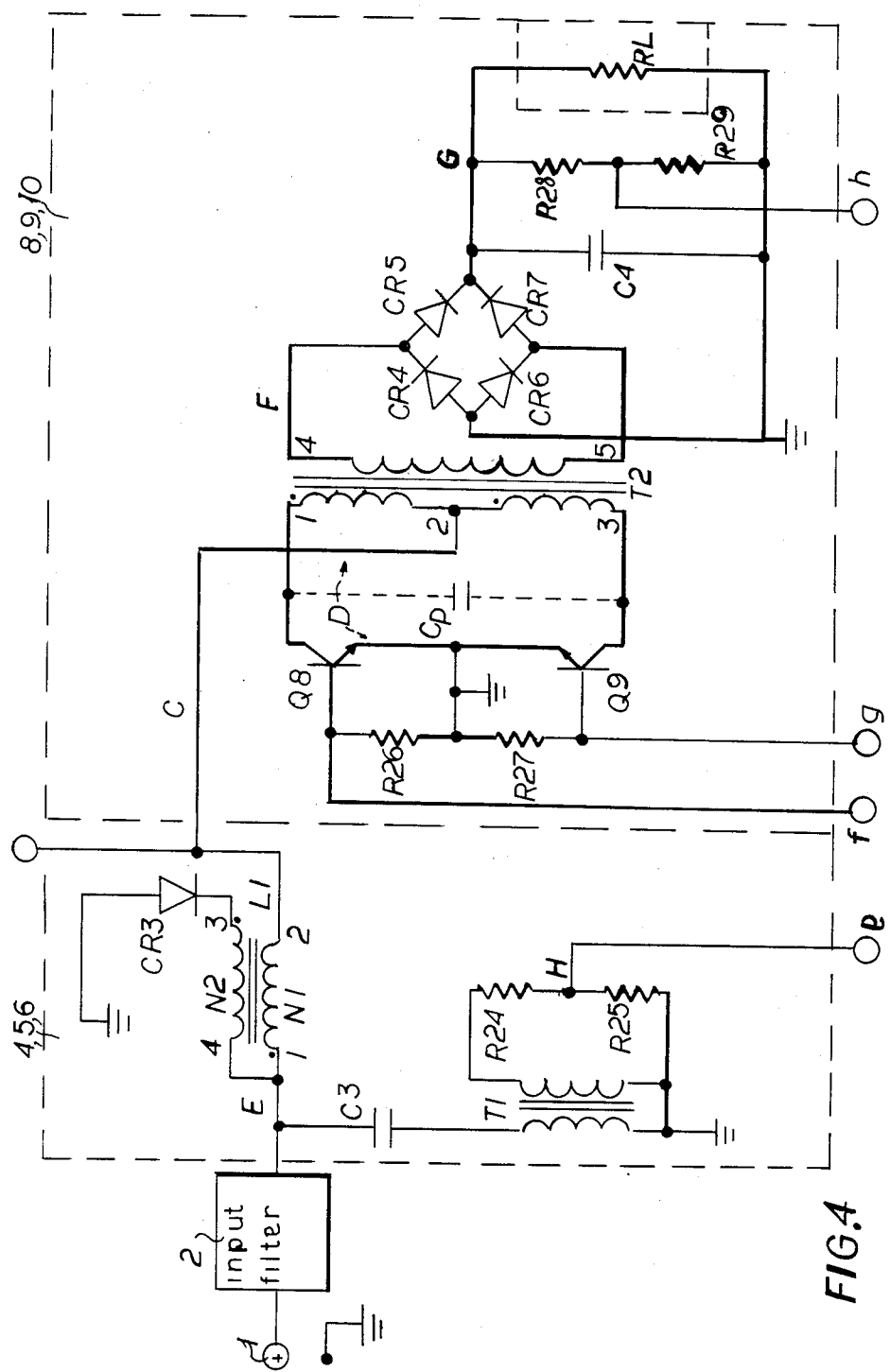
FIG. 4 is a circuit diagram of the magnetic current generator or nonlinear inductive circuit previously mentioned and the inverter and rectifier circuits connected thereto.

Referring now to FIG. 4, it can be seen here that the energy recovery capacitor C3 is connected to the primary winding of a transformer T1, whose other terminal is grounded and whose secondary winding is bridged by a voltage divider formed by resistors R24 and R25 from which the voltage waves form G (FIG. 2g) is tapped to apply a signal e to the voltage divider represented by the resistors R13 and R14 of the driver.

Terminals f and g of the inverter are connected respectively to the terminal c and d at the right-hand side of the driver 7 and are connected in turn to the bases of the power transistors Q8 and Q9, whose emitters are grounded. The junction between the emitter base resistors R26 and R27 of these transistors are likewise grounded.

The magnetic generator is here shown to be a reactor L1 which will be described in greater detail subsequently. The reactor in series with the input filter 2 and the source 1 is connected to the center tap of the primary winding of a transformer T2 also representing an output transformer, the primary winding having ends defined by the terminals 1 and 3 which are connected to the collectors of the transistors Q8 and Q9.

The secondary winding have terminals 4 and 5 which are connected across one diagonal of a rectifier bridge formed by diode CR4, CR5, CR6 and CR7, one output terminal of which is grounded while the other output terminal is connected to the load RL. A filter capacitor C4 is applied across the output of this rectifier and a voltage divider formed by resistors R28 and R29 enable a feedback signal h to be tapped from the load circuit for return to the terminal d of the main oscillator 3.

Figure 5:
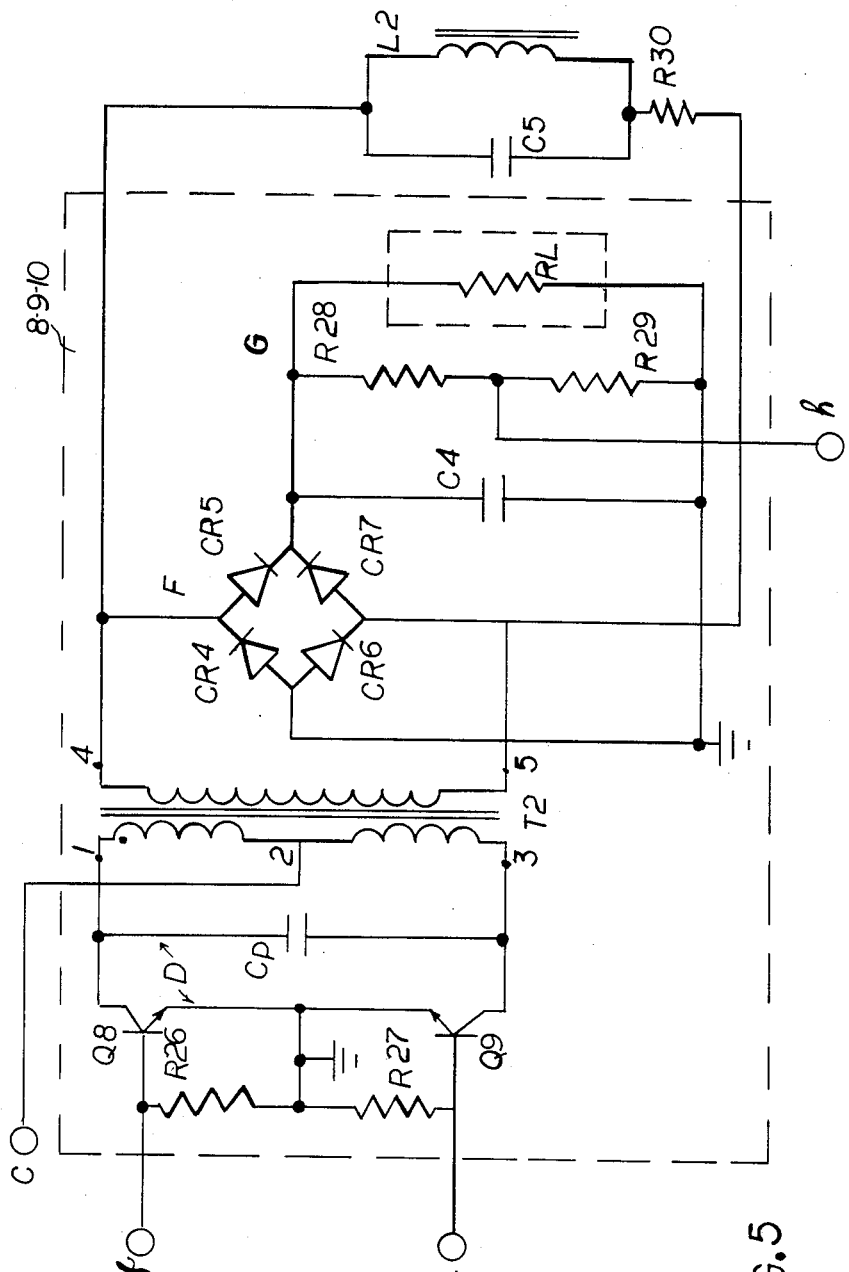
FIG. 5 is a circuit diagram of another embodiment of the inverter-converter portion of the circuit and the load and rectifier portion of the circuit of FIG. 1.

In FIG. 5, while the converter socket is constructed somewhat differently, components which are functionally equivalent to that of FIG. 4 have been represented by the same reference characters in this embodiment, a resonant network consisting of a capacitor C5 connected in parallel to an inductor L2 is connected across the secondary winding of transformer T2.

As noted previously, a direct current primary source is connected to the line 1 and hence to the input filter 2. The input filter 2 is conventional and reduces alternating current transmitted to the inverter by rejecting the alternating current to the source and removing noise which may be transmitted to the inverter from the source.

The SG1524 intergrated circuit oscillator sends a square wave (FIG. 2A) to pilot circuit 7 and from this pilot circuit (FIG. 2B) to inverter 8.

The power supplied to the inverter by the supply line 1 through the filter 2 and the magnetic current generator which is intended to hold constant the current delivered to the inverter for the period of time in which the chopper transistors or power transistors of the inverter, namely, the transistors Q8 and Q9, are conductive. The on time of these transistors is variable and normally never exceeds 80% of each half period of a cycle. During the off time the magnetic current generator, through a secondary winding N2 and a diode CR3 recovers, the recovery energy being extracted through the capacitor 5 represented at C3.

This recovers the energy which accummulated during inverter transistor on time by keeping the primary current constant.

The current sensor 6 sends a signal (FIG. 2H) to the main oscillator and controller 3 which is proportional to the alternating current passing through the filter and recovery capacitor 5. The value of this alternating current is thus tied to the current supplied to the converter and when this exceeds a preset threshold, the main oscillator is affected to limit the current drawn by the inverter by limiting the switch on time and providing a soft start current-peak-free operation of the inverter transistors; this circuit also reduces any tendency to damage during accidental short circuits between the output lines of the inverter 8.

The inverter 8, driven by the signals produced by the driver, has an AC voltage at its output which is rectified by the circuit 9 and applied to the load 10. The AC output has a feedback h as previously described to permit AC regulation with varying load and supply voltage.

The protection and command circuit 11 can block the inverter 8 in the event of overload or short circuit and also switch the inverter on or off by means of commands coming from the command line 12.

Referring now to FIG. 3 in greater detail, it may be noted that the integrated circuit SG1524 (Silicon General, Texas Instruments) has a soft start circuit and current limiter formed by the capacitor C1, the diode CR2, the resistor R3, the diode CR1, the resistor R1, the resistor R2 and the transistor Q1 and a feedback circuit represented by the resistors R4 and R5 to regulate gain.

Resistors R6 through R8 apply reference voltage to the error amplifier inside the integrated circuit SG1524.

The network R9C2 is a time constant circuit to set the oscillator frequency within the I.C.SG 1524.

The driving circuit has transistors $Q_2$–$Q_7$ which adapt the signal impedance (FIG. 2A) at the I.C. output to the output signal required (terminals c and d) and (FIG. 2B) to drive the power transistors of the inverter.

As can be seen from FIG. 4, the magnetic current generator 4 consists of a reactor L1 having a primary wiinding N1 in series with the center tap terminal 2 of the primary winding of transformer L1 and the source 1 via the input filter 2. The secondary winding N2 is is connected through an oppositely poled diode CR3 to ground and the winding N2 has opposite polarity from the winding N1 of the reactor. Energy recovery therefore is effected when the inverter transistors Q8 and Q9 are in blocking modes.

The filter and recovery capacitor 3 filters the voltage upstream of the inductors L1 and draws the current which is sent to it during recovery of the magnetic current generator 4.

As noted, the current sensor formed by the transformer T1 and resistors R24 and R25 apply to control terminal b of main oscillator 3 (FIG. 3) and alternating current voltage (FIG. 2H) proportional to the current drawn by the inverter 8 so as to limit this to a preset value.

The resistors R28 and R29 provide their output through terminal h which is a feedback voltage applied to terminal a of the main oscillator of FIG. 3 to regulate the voltage present on the load.

FIG. 2A shows the output wave forms of main operator to be square waves and to have a variable duration as controlled by means of the error amplifier and the logic circuits present in the I.C. SG 1524.

This voltage is applied to driver 7 which acts as the impedance matcher, and the voltage at terminals c-d is applied to the inverter (waveform D in FIG. 2D) via terminals f and g.

The inverter receives energy from the primary source 1 through the input filter 2 and magnetic generator 4.

FIG. 2C shows the waveform (current and voltage formed) at the inverter input while FIG. 2D shows the inverter input current waveforms and the collector emitter voltage of transistors Q8 and Q9 of the inverter 8.

An analysis of these waveforms shows that the input current to the inverter 8 is constant when either Q8 or Q9 is conductive and is 0 when both of them are off or nonconductive. During the recovery time, the reactor L1 recovers energy by reversing in polarity and this energy is stored in the capacitor C3 represented by the filter 5. This can be seen from FIG. 2E which shows the current and voltage waveforms upstream of the reactor L1.

During recovery, the current changes direction and moves totally into the capacitor C3. When, however, either Q8 or Q9 is conductive, the capacitor C3 contributes energy to the inverter (FIG. 2E).

FIG. 2C emphasizes that there is an overvoltage at the inverter input during recovery which has an amplitude equal to the line voltage supplied by the source 1 times the ratio N2/N1 (FIG. 4) of the inductor L1. This overvoltage is instantaneously fed as bias to the collectors of the transistors Q8 and Q9 (FIG. 2D). When transistors Q8 and Q9 are off, transformer T2 does not transfer energy because the output load voltage obtained through the rectifiers CR4, CR5, CR6, CR7 and filter capacitor C4 is at a level (FIG. 2G) which is higher than the AC voltage (FIG. 2F) maintained by the parasitic capacitor CP, the latter being either the capacitance of the higher voltage transformer or the capacitance of circuits connected to the higher voltage transformer. The parasitic capacitor CP is particularly high in higher voltage transformers which provide a high turn ratio. The parasitic capacitance is also high when capacitive circuits are used when there are low voltage loads with low transformer ratios.

In fact, as soon as both transistors Q8 and Q9 are nonconductive, the output DC voltage, thanks to capacitor C4 (FIG. 4) decays much more slowly than the alternating current voltage applied to the rectifying diodes. By correct dimensioning of capacitor C4, rectifying diodes are blocked with a voltage drop equal to about 10% that of the output with a reduction of overall losses amounting to about 80% of those which would be obtained with a square wave output or with an inductive filter at the output.

FIG. 2F shows the voltage in current AC output of the inverter and the smoothed trapezoidal waveform of the AC voltage resulting from transistors Q8 and Q9 (FIG. 2D) and the collector voltage waveforms at the latter. This current, transferred to the diode CR4-CR7 lasts only during the interval in which the transistors Q8 and Q9 are conductive. During the recovery time (500 microseconds) of diode CR4-CR7, the current in the diodes is provided by the parasitic capacitance Cp or by any other suitable auxiliary capacitive circuit which can be applied to the AC output line. In FIG. 5 this circuit is the resonant network formed by the inductor L2 and the capacitor C5, a resistor R30 being connected in series therewith as a limiter and damper.

I claim:

1. A pulse-width-modulated inverter-converter for generating a output from a direct-current supply voltage, comprising:

a source of said direct-current supply voltage;

a power inverter connected to said source and provided with a power transformer;

a pair of transistors each having a respective emitter-collector network connected between a respective end of a primary winding of said transformer and ground, said power transformer having a secondary winding, a signal applied to said primary winding being controlled so that a smoothed trapezoidal waveform is outputted by said transformer;

a full-wave rectifier connected across said secondary winding and receiving said smoothed trapezoidal waveform therefrom for applying said output to said load;

a main oscillator connected to said source and generating from said direct-current supply voltage a substantially square wave signal adapted to determine the frequency of said power output;

means connecting said main oscillator to said power inverter for generating said power output therein; and means including a nonlinear inductive element responsive to current drawn therethrough and interposed between said source and said power inverter for sending constant current energy to said power transformer and the load, wherein said nonlinear inductive element includes:

a reactor having one winding connected in series between an input filter connected to said source and a centertap of said primary winding of said transformer, and said reactor having another winding, said other winding is of opposite polarity from said one winding and is connected in series with an output of said filter, a nonlinear diode having an anode connected to ground and a cathode connected to said other winding, and a filter and recovery capacitor connected upstream of said reactor, said nonlinear diode acting as an energy recovery element toward said filter and recovery capacitor.

2. A pulse-width-modulated inverter-converter as defined in claim 1, further comprising a parasitic capacitor connected across said primary winding.

3. A pulse-width-modulated inverter-converter as defined in claim 2, further comprising a parallel-resonant circuit of an inductor and a capacitor connected in series with a damping resistor across said secondary winding.

* * * * *